Patented Dec. 16, 1941

2,265,993

UNITED STATES PATENT OFFICE 2,265,993

DERIVATIVES OF OLEFINIC COMPOUNDS AND METHOD OF MAKING

Leland James Beckham, Marcellus, N. Y., assignor to The Solvay Process Company, New York, N. Y., a corporation of New York No Drawing. Application July 28, 1938, Serial No. 221,707

25 Claims. (Cl. 260—513)

This invention relates to novel chemical products obtainable from olefinic compounds and to a process for their preparation. It especially relates to a process for the preparation of products from olefines, which products are characterized by their surface active properties, making them valuable for use as detergents, and wetting, dispersing, emulsifying, and the like agents. More particularly, the invention relates to sulfonic acid compounds obtainable from olefines containing 10 to 30 carbon atoms, which compounds are particularly valuable as detergents, and wetting, dispersing, emulsifying, and the like agents, and to a process for their preparation.

It is an object of the invention to provide a process for the preparation of compounds having surface active properties, making them valuable as detergents, and wetting, dispersing, emulsifying, and the like agents, utilizing relatively inexpensive and readily available raw materials. Another object of the invention is to provide a process for preparing valuable compounds containing a sulfonic acid group in the free acid or salt form from olefines in an efficient and economic manner. A further object of the invention is to provide compounds having surface active properties making them valuable for use as detergents, and wetting, dispersing, and the like agents.

Other objects of the invention will in part be obvious and will in part appear hereinafter.

In accordance with the present invention, valuable compounds are prepared by reacting the addition product of an olefine or a mixture of olefines and nitrosyl chloride or nitrosyl bromide with a reagent, such as sodium sulfite, whereby the halogen present in the addition product is replaced by a radical comprising a water-solubilizing group. Thus, it has been found that the chlorine present in the addition product of an olefine and nitrosyl chloride is easily replaceable and that by reacting the addition product with sodium sulfite, compounds are formed containing sulfonic acid groups in their molecules. Since the sulfonic acid group is a water-solubilizing group, the compounds in the free acid or salt form are more or less soluble in water depending upon the length and nature of the carbon chain or chains of the olefine or mixture of olefines used in the preparation of the addition product. In the following discussion and in the claims, where "sulfonic acid group" is referred to it will be understood that a sulfonic acid group in either the free acid or salt form is intended. The sulfonic acid compounds derived from olefines containing 10 to 30 carbon atoms are of especial importance. These compounds have surface active properties making them useful as detergents and wetting, dispersing, emulsifying, and the like agents. Of this class of compounds, those which are derived from olefines containing from 14 to 24, and especially from 16 to 19, carbon atoms have been found to be particularly valuable.

The addition product of an olefine and nitrosyl chloride referred to above is the product obtained by reacting an olefine or a mixture of olefines (which olefine or mixture of olefines may be in admixture with relatively inert materials, such as organic solvents, saturated hydrocarbons, etc.) with nitrosyl chloride so as to convert the olefine or olefines to nitroso alkyl chlorides; i. e., compounds in which a nitroso group and a chlorine atom are attached to adjacent carbon atoms which formed an unsaturated linkage in the olefine. The formation of nitroso alkyl chlorides is indicated by the appearance of the blue or green color characteristic of these compounds. The product formed in this reaction also contains alkene dichlorides, other nitroso compounds, amine and/or hydrazine derivatives, possibly other reaction products of undetermined nature, unreacted olefines, and, if such compounds are present in the starting material, substantially unchanged saturated hydrocarbons. Experiments leading to the development of the invention have indicated that the addition product as first formed is relatively unstable and that the greater proportion at least of the nitroso alkyl chlorides contained therein are converted upon standing to polymeric or isomeric forms, such as dimers of undetermined structure and chloroximes. In speaking of the addition product of an olefine or a mixture of olefines and nitrosyl chloride in the specification and claims, it will be understood that it is intended to refer to the product before and after conversion of the nitroso alkyl chlorides to polymeric or isomeric forms.

The olefine-nitrosyl chloride addition product may be prepared in any suitable manner. One convenient method involves adding to the selected olefine or mixture of olefines, in the presence or absence of saturated hydrocarbons, sufficient nitrosyl chloride to convert the desired amount of the olefine to reaction products. If desired, the reaction may be carried out in the presence of a volatile solvent. The amount of nitrosyl chloride to be used in a particular case will depend principally upon the olefine or olefines used and the conditions of operation (such as temperature, whether the operation is a batch or continuous operation, etc.). Thus, under some conditions it may be found desirable to convert substantially all of the olefine (70 to 100 per cent) to reaction products, while under other conditions it may be found to be preferable to convert only a relatively small proportion of the olefine to such products. In general, the amount of nitrosyl chloride used should not be materially less than one-half mol for each mol of olefine. Where maximum conversion is desired, two or more mols may be used. Under normal conditions of operation, the use of one to two mols of nitrosyl chloride for each mol of olefine produces satisfactory results.

The nitrosyl chloride can be introduced into the olefine as a gas or a liquid, or, in cases where a solvent is employed, in solution in the solvent. The reaction can be carried out at temperatures varying over wide limits providing an important amount of nitroso alkyl chlorides are formed. For example, temperatures varying from $-20°$ to $80°$ C. have been found to be suitable. Since ordinary atmospheric temperatures and pressures are satisfactory, the reaction may be conveniently carried out under these conditions. The time necessary to complete the reaction depends upon the specific solvent, temperature, concentration, and other conditions employed, but, in general, varies from one to twenty-four hours. After the formation of the addition product has been completed, the solvent, if used, and the excess nitrosyl chloride are removed by evaporation, preferably at as low a temperature as convenient; in any case not above about $80°$ C., vacuum vaporization being employed if necessary.

In order to convert the addition product to a product containing sulfonic acid groups, it is preferably mixed with an aqueous solution containing at least one mol of sodium sulfite for each mol of the addition product used in the reaction. The resulting mixture is then maintained at a temperature adapted to cause replacement of the chlorine atom in the addition product, preferably at a temperature between $60°$ and $130°$ C., and especially about $100°$ C., under slight pressure if necessary. During the reaction, it is important to maintain intimate contact between the aqueous sodium sulfite solution and the addition product. This may be conveniently accomplished by subjecting the reaction mixture to vigorous agitation. The time necessary to bring the reaction to completion varies, depending on a number of factors, principally degree of contact, temperature, the specific olefine used, and the pH of the reaction mixture. In general, alkaline conditions increase the rate of reaction, and acidic conditions greatly retard the rate. It has been found, however, that in reactions involving an addition product containing chlorine attached to a tertiary carbon atom, while the rate of reaction is high under alkaline conditions, there is also an increase in the amount of undesirable side reactions. Hence, an addition product of this type can be reacted more efficiently at pH values lying in the slightly alkaline or neutral range. Since addition products prepared from a mixture of olefines ordinarily contain compounds in which a chlorine atom is attached to a tertiary carbon atom, in general, the reaction should be carried out under substantially neutral conditions.

To determine the time required for the sulfonation reaction in any particular case, small aliquot portions of the reaction mixture may be withdrawn at intervals and tested for their content of water-insoluble materials. When the content of water-insoluble materials in the withdrawn portions ceases to decrease, the reaction is complete. In cases where the temperature is maintained at about $100°$ C. and the reaction mixture is substantially neutral, the reaction is substantially complete in about twenty-four hours.

At the end of the sulfonation step, the resulting product, which is in the form of a solution or suspension, consists of a water-soluble portion containing sulfonic acid compounds and a water-insoluble portion. The product is then cooled, separated into a water-soluble and water-insoluble portion, and the water-soluble portion is evaporated to dryness in the presence of air so as to oxidize any sulfite present to sulfate. This dry product is a white or light buff powder and has surface active properties which will vary in degree depending upon the length and character of the carbon chain of the olefine used and the location of the sulfonate group.

The chemical nature of the products of the present invention is not definitely known, and it is therefore not intended to limit the invention to any theoretical explanation. Tests made, however, have shown that these products are mixtures of sulfonic acid compounds containing alkyl groups, and that substantial proportions of the mixtures are alkyl ketone compounds in which a sulfonic acid group is attached to a carbon atom adjacent to the keto carbon atom. Further, when the olefine used as the starting material contains an unsaturated linkage at the end of the chain, the products comprise a proportion of aliphatic aldehydes containing an alpha-sulfonic acid group. The products further include alkyl sulfonic acid compounds containing combined nitrogen and/or oxygen, a proportion of which is probably composed of nitroso compounds or oximes. As an indication of the amount of nitrogen-containing compounds in the products, tests have shown the presence of from 20 to 40 mol per cent of organic nitrogen based on the mols of olefine present. In many cases, a smaller proportion of the products appears to be composed of compounds containing combined chlorine.

The products ordinarily contain a proportion of inorganic salts. When sodium sulfite, for example, is used, before separating the water-soluble portion from the remainder of the reaction mixture, the reaction mixture is preferably subjected to air oxidation, as above described, so as to convert the unreacted sodium sulfite to sodium sulfate. When this is done the recovered product contains sodium sulfate, the amount depending upon the amount of sodium sulfite added and consumed in the reaction. Since in many cases the presence of inorganic salts, such as sodium sulfate, improves the properties of the products, it is not necessary to remove these salts. It will be understood, however, that, if desired, products can be obtained free from sulfates or other salts formed in the reaction. Thus, the products can be extracted from the excess sulfite and other salts with a solvent, the solvent removed, and the products used free of inorganic filler, or a desired filler can be added. Further, the sulfite can be decomposed by acidification with a strong acid which is neutralized by the alkali metal content of the solution to form a filler.

Whether used alone or in combination with a filler, the products in general have surface active properties making them valuable for use in processes where it has been customary to employ detergents, and wetting, dispersing, emulsifying and the like agents. Thus, the products obtained from an addition product of an olefine or mixture of olefines containing 10 to 30 carbon atoms and nitrosyl chloride with the use of sodium sulfite are chemically stable under acid and alkaline conditions, are resistant to lime, foam well, and possess good cleansing power. The products of this class possess varying solubilities in water depending upon the number of carbon atoms in the olefine. The products can be used in the various wet treatment processes of the textile industry including dyeing, cleansing, scouring, bleaching, etc. Further, they can be employed as flotation agents, as cleansing agents, and as dispersing and emulsifying agents in the preparation of dispersions and emulsions; e. g., aqueous dispersions and emulsions of solids and liquids which are insoluble or only slightly soluble in water.

The olefines employed as starting materials in the process may be straight or branched chain compounds and may be naturally occurring olefines or such as are prepared by synthetic processes. In general, olefines which contain a straight chain of at least 8 carbon atoms are preferred. Further, while the unsaturated linkage may appear anywhere in the carbon chain or chains of the olefines, for most purposes the more valuable products are obtained from olefines containing an unsaturated linkage at the end of a carbon chain of at least 8 carbon atoms. Thus, suitable olefines are those prepared by dehydration of alcohols obtained from naturally occurring fats and oils such as tallow, palm oil, cocoanut oil, or olive oil, by hydrogenation of the fat or oil as such or in the form of esters. Similar olefines can be obtained by the destructive distillation of waxes; for example, cetene obtained from spermaceti. Olefines contained in or obtainable from petroleum or petroleum products are of especial interest from an economic standpoint. Thus, olefines obtainable from petroleum by cracking processes (e. g., by cracking paraffin wax or oil in the liquid or vapor phase); or by halogenation (e. g., by chlorination of a gas oil fraction) followed by dehydrohalogenation; or by polymerization of low molecular weight olefines, can be used in the process. Also, olefines obtainable by the polymerization of carbon monoxide and hydrogen in the presence of a catalyst such as cobalt are of interest in this connection. As examples of specific olefines which are adapted for use in the process, the following are mentioned:

Cetene-1 ($C_{14}H_{29}CH$—$CH_2$)
2-methyl pentadecene-2 ($C_{12}H_{25}CH$=$CH(CH_3)_2$)
Dodecene-1 ($C_{10}H_{21}CH$=$CH_2$)
Pentadecene-7 ($C_6H_{13}CH$=$CHC_7H_{15}$)
Tricosene-11 ($C_{10}H_{21}CH$=$CHC_{11}H_{23}$)
10-methyl nondecene-9 ($C_8H_{17}CH$=$CCH_3(C_9H_{19})$)
Nondecene-9 ($C_8H_{17}CH$=$CHC_9H_{19}$)

When an olefine is referred to in the specification and claims, it will be understood that mixed olefines as well as single olefines are intended, unless otherwise indicated.

As stated above, olefines contained in or obtainable from petroleum may be used in the process. As a feature of the invention, it has been found that in using such olefines it is not necessary to separate them from the saturated hydrocarbons which normally make up a part of olefine-containing products from petroleum. This is based upon the fact, determined in the course of the development of the invention, that saturated hydrocarbons are relatively unreactive with nitrosyl chloride under the conditions adapted for effecting reaction of olefines with this compound. This fact makes it possible to employ in the process relatively inexpensive mixtures of olefines and saturated hydrocarbons. Thus, mixtures of olefines and saturated hydrocarbons obtained from petroleum (e. g., from paraffin wax or oil or other petroleum fraction) by cracking processes may be used.

It has been stated above that the formation of the addition product may be accomplished in the presence of a solvent. The solvents suitable for use in this connection are those in which the olefine employed is soluble and which undergo no substantial reaction with nitrosyl chloride. The preferred solvents are those which have relatively high volatilities so that they may be removed by vaporization with or without vacuum at a temperature below 80° C. The solvents, of course, must be liquids at the reaction temperature and pressure. A solvent assists in bringing the nitrosyl chloride and the olefine into reactive contact and, in most cases, also assists in preventing the undesirable evolution of nitrosyl chloride as a gas during the reaction. Further, it appears that solvents catalyze the reaction; i. e., they increase the rate of reaction or reduce the ratio of side reactions to the desired reaction. It will be apparent that a large number of solvents are adapted for use in the reaction. For example, chlorinated solvents, such as chloroform and carbon tetrachloride; low boiling hydrocarbons, such as petroleum ether and benzene; diethylether; dioxane; and the like, may be used.

The following examples describe processes coming within the scope of the invention. It will be understood that these examples are given for illustrative purposes and are not intended to limit the invention. The parts are by weight and the temperatures in degrees Centigrade:

*Example 1, Part 1.*—112 parts cetene-1 (1 mol) are dissolved in dry chloroform. To the solution, 45 parts of nitrosyl chloride (1.4 mols), dissolved in 1500 parts of chloroform, are added over a period of 6 hours while maintaining the temperature at about 50°. The chloroform and excess nitrosyl chloride are then removed by heating at atmospheric pressure. There is obtained an addition product of cetene-1 and nitrosyl chloride.

*Part 2.*—300 parts of water and 63 parts of anhydrous sodium sulfite are added to the addition product prepared as described in Part 1 of this example. The resulting mixture is heated to a temperature of 100° and is maintained at this temperature for 24 hours while stirring. At the end of this period, the unreacted water-insoluble materials in the reaction mixture are removed from the remainder of the mixture as by a procedure involving extraction with an organic solvent such as diethylether. The aqueous solution of the water-soluble products of the reaction is evaporated to dryness by heating in the presence of air at atmospheric pressure. During the drying, substantially all of the excess sodium sulfite is oxidized by the oxygen of the air to sodium sulfate. The product obtained is in the form of a white or light buff powder and is an excellent detergent, wetting, emulsifying, dispersing, and the like agent.

*Example 2, Part 1.*—The olefine used in this example is a hydrocarbon mixture containing a large percentage of olefines together with some paraffins (which may be open-chain paraffins, cycloparaffins, or both), which is obtained by the liquid phase cracking of paraffin wax. The hydrocarbon mixture has a bromine number of 63 and is essentially composed of hydrocarbons with an estimated carbon content of 16 to 19 carbon atoms per molecule. To 36 parts of this hydrocarbon mixture, 13 parts of liquid nitrosyl chloride are added at a temperature of 5° and the resulting solution is maintained at 0° to 5° for 1½ hours. The nitrosyl chloride remaining is removed by blowing air across the solution. An addition product of the mixture of olefines and nitrosyl chloride is obtained.

Part 2.—The addition product prepared as described in Part 1 of this example is added to 85 parts of an aqueous solution containing 17.9 parts of sodium sulfite. The mixture is stirred vigorously for 24 hours while maintaining a temperature of 100°. The cooled solution is then extracted with diethyl ether and the water layer is evaporated to dryness. A white powder is obtained which analysis shows to consist of a mixture of sulfonation derivatives as the sodium salts and sodium sulfate. The aqueous solution of the powder foams readily and is an excellent washing agent.

Example 3.—92 parts of a cetene-nitrosyl chloride addition product containing 2.7 per cent nitrogen and 13.3 per cent chlorine (corresponding to about 80 per cent olefine attack) prepared in a manner similar to that described in Example 1, Part 1, are added to a solution of 42 parts of $Na_2SO_3$ in 200 parts of water. The resulting mixture is stirred vigorously for 24 hours at 100°. The cooled solution is extracted with diethyl ether and the water-soluble layer is evaporated to dryness. 77 parts of a product having good detergent, foaming, and wetting properties are obtained.

By varying the procedures described in the examples, other products having properties similar to the properties of the products of the examples may be prepared. Thus, in place of the olefines employed in the examples, any one or a mixture of the olefines previously mentioned can be used. For example, by substituting on an equimolecular basis, each of the olefines hereinbefore specifically mentioned for the centene-1 in Example 1, products having similar properties to the product of that example can be obtained. By selective choice of the olefine used as the starting material in the process, products may be obtained possessing detergent and/or wetting and/or emulsifying properties differing in desired degree from the properties of the products of the examples. As previously indicated, however, the more valuable products are those obtained from olefines containing from 10 to 30, preferably from 14 to 24, and especially 16 to 19, carbon atoms. In this connection it has been found that the optimum carbon content of the olefines is a function of the olefine structure, being in general several carbon atoms less for a straight-chain olefine with the unsaturated linkage at one end of the chain than for other types of olefines. For most purposes, it is preferable to employ olefines which contain a straight chain of at least 8 carbon atoms.

It will be understood that sulfites other than sodium sulfite can be used in the present process. The other alkali metal (including ammonium) sulfites are of especial interest in this connection. In using other sulfites, the specific conditions will vary from those described in the examples, but the same general procedures may be employed.

While the processes disclosed in the examples are batch processes, continuous operation is not excluded from the scope of the invention. In operating the process in a continuous manner, the solvent, if used, and the unreacted nitrosyl chloride would be recycled to the first step of the process. Unreacted olefine separated from the mixture obtained by treatment of the addition product with sodium sulfite, for example, would be recycled to the step of the process wherein olefine is reacted with nitrosyl chloride. Further, in continuous operation the liquors employed in the sulfite step would preferably be recycled for additional reaction in this step, the paraffins and other constituents of the original crude olefine being removed in a bleed from the cycle.

In the above discussion, processes involving an addition product of an olefine and nitrosyl chloride have been disclosed in some detail. As before indicated, the invention also includes processes in which an addition product of an olefine and nitrosyl bromide is used as the starting material. Thus, by reacting an olefine-nitrosyl bromide addition product with sodium sulfite or equivalent agent, the bromine contained therein may be replaced by a sulfonic acid group to form a final product similar to those described above.

It will be understood that the invention is not limited to a process in which a sulfite, and specifically sodium sulfite, is used for reaction with an olefine-nitrosyl chloride or bromide addition product. Thus, the invention in its broader aspects includes other processes wherein an addition product of the class specified is treated so as to replace the chlorine or bromine atom contained therein with a radical comprising (i. e., consisting of or containing) a group capable of increasing the water-solubility of organic compounds; that is, a water-solubilizing group. The processes contemplated include processes in which the treatment of an addition product to replace the chlorine or bromine therein with a radical comprising a water-solubilizing group is carried out in one or more stages; the first stage of the treatment, which may be the only stage, involving reacting the addition product with a compound containing a reactive cation (i. e., a cation which is capable of reacting with a halogen atom contained in an aliphatic compound to form a compound with the halogen atom) whereby the reactive cation combines with the halogen of the addition product and a residue of the compound, which may be a radical comprising a water-solubilizing group or a radical comprising a group capable of being converted to a water-solubilizing group upon further treatment, replaces the halogen of the addition product. For example, the invention includes processes wherein an addition product is reacted with other water-soluble salts of oxygen-containing polybasic inorganic acids which are capable of reacting with an aliphatic compound containing an easily replaceable chlorine atom to replace the chlorine atom with a residue of the acid. As examples of such salts, which are conveniently termed "reactive" salts, there may be mentioned the alkali metal thiosulfates.

Since certain changes may be made in carrying out the above described process without departing from the scope of the invention, it is intended that all matter contained in the above

I claim:
1. The process which comprises treating the addition product of an olefine and a nitrosyl halide selected from the group consisting of nitrosyl chloride and nitrosyl bromide, said addition product containing a replaceable halogen atom, to replace the halogen atom with a radical comprising a water-solubilizing group.

2. In the process of treating the addition product of an olefine and a nitrosyl halide selected from the group consisting of nitrosyl chloride and nitrosyl bromide, said addition product containing a replaceable halogen atom, to replace the halogen atom with a radical comprising a water-solubilizing group, the step which comprises reacting said addition product with a compound containing a reactive cation, whereby the reactive cation combines with the halogen atom of said addition product and the residue of said compound replaces the halogen atom in said addition product.

3. The process which comprises reacting the addition product of an olefine and nitrosyl chloride, said addition product containing replaceable chlorine, with a reactive water-soluble salt of an oxygen-containing polybasic inorganic acid to replace chlorine in said addition product with the residue of the acid.

4. The process which comprises reacting the addition product of an olefine containing from 10 to 30 carbon atoms and nitrosyl chloride, said addition product containing replaceable chlorine, with a reactive alkali metal salt of an oxygen-containing polybasic inorganic acid to replace chlorine in said addition product with the residue of the acid.

5. The process which comprises reacting the addition product of an unsaturated aliphatic compound and a nitrocyl halide selected from the group consisting of nitrosyl chloride and nitrosyl bromide, said addition product containing a replaceable halogen, with an alkali metal sulfite to replace halogen in said addition product with a sulfonic acid group.

6. The process which comprises reacting the addition product of an olefine and a nitrosyl halide selected from the group consisting of nitrosyl chloride and nitrosyl bromide, said addition product containing a replaceable halogen, with an alkali metal sulfite to replace halogen in said addition product with a sulfonic acid group.

7. The process which comprises reacting the addition product of an olefine and a nitrosyl halide selected from the group consisting of nitrosyl chloride and nitrosyl bromide, said addition product containing a replaceable halogen, with sodium sulfite to replace halogen in said addition product with a sulfonic acid group.

8. The process which comprises reacting the addition product of an olefine and nitrosyl chloride, said addition product containing replaceable chlorine, with an alkali metal sulfite to replace chlorine in said addition product with a sulfonic acid group.

9. The process for the preparation of a product having surface active properties which comprises reacting the addition product of an olefine containing from 10 to 30 carbon atoms and nitrosyl chloride, said addition product containing replaceable chlorine, with an alkali metal sulfite to replace chlorine in said addition product with a sulfonic acid group.

10. The process for the preparation of a product having surface active properties which comprises heating a mixture of an aqueous solution of an alkali metal sulfite and the addition product of an olefine containing from 10 to 30 carbon atoms and nitrosyl chloride at a temperature from 60° to 130° C. to replace chlorine in said addition product with a sulfonic acid group.

11. The process for the preparation of a water-soluble product having surface active properties which comprises heating a mixture of an aqueous solution of an alkali metal sulfite and the addition product of an olefine containing from 14 to 24 carbon atoms and nitrosyl chloride, said addition product containing replaceable chlorine, at a temperature of 60° to 130° C., thereby converting the mixture to a water-soluble portion containing sulfonic acid compounds and a water-insoluble portion, and separating said water-soluble portion from said water-insoluble portion.

12. The process for the preparation of a water-soluble product having surface active properties which comprises heating a mixture of an aqueous solution of sodium sulfite and the addition product of a mixture of olefines and nitrosyl chloride, said addition product containing replaceable chlorine, at a temperature of 60° to 130° C., thereby converting the mixture to a water-soluble portion containing sulfonic acid compounds and a water-insoluble portion, separating said water-soluble portion from said water-insoluble portion, and drying said water-soluble portion.

13. The process which comprises reacting nitrosyl chloride with a composition obtained from petroleum comprising olefines and saturated hydrocarbons to convert said composition to a mixture of an addition product of the olefines with nitrosyl chloride and said saturated hydrocarbons, and heating said mixture in admixture with an aqueous solution of an alkali metal sulfite to replace chlorine in said addition product with the sulfonic acid group.

14. The process which comprises reacting nitrosyl chloride with a composition obtained from petroleum comprising olefines and saturated hydrocarbons, the olefines in said composition containing an average of 10 to 30 carbon atoms, to convert said olefines to an addition product with nitrosyl chloride, and reacting said addition product with a reactive water-soluble salt of an oxygen-containing polybasic inorganic acid to replace chlorine in said addition product with the residue of the acid.

15. The process which comprises reacting nitrosyl chloride with a composition obtained from petroleum by a cracking process, to convert said composition to a mixture containing an addition product of nitrosyl chloride with unsaturated hydrocarbons in said composition, said addition product containing replaceable chlorine, and reacting said addition product with an alkali metal sulfite to replace chlorine in said addition product with a sulfonic acid group.

16. The process which comprises reacting a composition obtained from petroleum by a cracking process with nitrosyl chloride at a temperature of —20° to 80° C. to convert said composition to a mixture containing an addition product of nitrosyl chloride with unsaturated hydrocarbons in said composition, said addition product containing replaceable chlorine, and heating said mixture in admixture with an aqueous solution of an alkali metal sulfite at a temperature of 60° to 130° C. to replace chlorine in said addition product with a sulfonic acid group.

17. A mixture of alkali metal salts of alkyl sulfonic acid compounds, said compounds including alkyl compounds containing nitrogen and alkyl compounds containing keto carbon atoms, said mixture being obtained by the process which comprises reacting a composition obtained from petroleum by a cracking process with nitrosyl chloride at a temperature of −20° to 80° C. to convert said composition to a mixture containing an addition product of nitrosyl chloride with unsaturated hydrocarbons in said composition, said addition product containing replaceable chlorine, and heating said mixture in admixture with an aqueous solution of an alkali metal sulfite at a temperature of 60° to 130° C. to replace chlorine in said addition product with a sulfonic acid group.

18. The process for the preparation of a product having surface active properties which comprises reacting a composition comprising a mixture of olefines containing an average of 10 to 30 carbon atoms with nitrosyl chloride at a temperature from −20° to 80° C. to form an addition product containing replaceable chlorine between the olefines and nitrosyl chloride, removing excess nitrosyl chloride from said addition product, heating said addition product in admixture with an aqueous solution of an alkali metal sulfite to replace chlorine in said addition product with the sulfonic acid group.

19. The process for the preparation of a water-soluble product having surface active properties which comprises reacting a composition comprising a mixture of olefines containing an average of 14 to 24 carbon atoms with nitrosyl chloride at a temperature from −20 to 80° C. to form an addition product containing replaceable chlorine between the olefines and nitrosyl chloride, removing excess nitrosyl chloride from said addition product, heating said addition product in admixture with an aqueous solution of sodium sulfite to replace chlorine in said addition product with the sulfonic acid group and thereby form sulfonic acid compounds, and recovering said sulfonic acid compounds.

20. A product having surface active properties comprising a mixture of alkyl compounds containing a radical comprising a water-solubilizing group, said compounds including alkyl compounds containing nitrogen and alkyl compounds containing keto carbon atoms, said product being obtainable by the process comprising treating the addition product of an olefine and a nitrosyl halide selected from the group consisting of nitrosyl chloride and nitrosyl bromide, said addition product containing a replaceable halogen, to replace the halogen with a radical comprising a water-solubilizing group.

21. A product having surface active properties comprising a mixture of alkyl sulfonic acid compounds, said compounds including alkyl compounds containing nitrogen and alkyl compounds containing keto carbon atoms, said product being obtainable by the process comprising reacting the addition product of an olefine and nitrosyl chloride, said addition product containing replaceable chlorine, with an alkali metal sulfite to replace chlorine in said addition product with the sulfonic acid group.

22. A product having surface active properties comprising a mixture of alkyl sulfonic acid compounds containing a total of 10 to 30 carbon atoms in the alkyl radicals thereof, said compounds including alkyl compounds containing nitrogen and alkyl compounds containing keto carbon atoms, said product being obtainable by the process comprising reacting the addition product of an olefine containing 10 to 30 carbon atoms and nitrosyl chloride, said addition product containing replaceable chlorine, with an alkali metal sulfite to replace chlorine in said addition product with the sulfonic acid group.

23. A product having surface active properties comprising a mixture of alkyl sulfonic acid compounds containing a total of 10 to 30 carbon atoms in the alkyl radicals thereof, said compounds including alkyl compounds containing nitrogen, alkyl compounds containing chlorine, and alkyl compounds containing keto carbon atoms, said product being obtainable by the process comprising reacting the addition product of an olefine containing 10 to 30 carbon atoms and nitrosyl chloride, said addition product containing replaceable chlorine, with an alkali metal sulfite to replace chlorine in said addition product with the sulfonic acid group.

24. A product having surface active properties comprising a mixture of sodium salts of alkyl sulfonic acid compounds containing a total of 10 to 30 carbon atoms in the alkyl radicals thereof, said compounds including alkyl compounds containing nitrogen and alkyl compounds containing keto carbon atoms, said product being obtainable by the process comprising reacting nitrosyl chloride with a composition obtained from petroleum comprising saturated hydrocarbons and olefines containing 10 to 30 carbon atoms to convert said composition to a mixture of an addition product of the olefines with nitrosyl chloride and said saturated hydrocarbons, and heating said mixture in admixture with an aqueous solution of sodium sulfite to replace chlorine in said addition product with the sulfonic acid group.

25. A product having surface active properties comprising a mixture of alkyl sulfonic acid compounds, including alkyl sulfonic acid compounds containing nitrogen and alkyl sulfonic acid compounds containing keto carbon atoms, said alkyl sulfonic acid compounds being products of the reaction of an alkali metal sulfite on the addition product of an unsaturated aliphatic compound with a nitrosyl halide selected from the group consisting of nitrosyl chloride and nitrosyl bromide, said addition product containing a replaceable halogen.

LELAND JAMES BECKHAM.